US011325426B2

(12) United States Patent
Tanaka

(10) Patent No.: US 11,325,426 B2
(45) Date of Patent: May 10, 2022

(54) TIRE

(71) Applicant: Sumitomo Rubber Industries, Ltd., Kobe (JP)

(72) Inventor: Kouichirou Tanaka, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 650 days.

(21) Appl. No.: 16/130,651

(22) Filed: Sep. 13, 2018

(65) Prior Publication Data
US 2019/0105950 A1 Apr. 11, 2019

(30) Foreign Application Priority Data

Oct. 5, 2017 (JP) .............................. JP2017-195299

(51) Int. Cl.
B60C 11/03 (2006.01)
B60C 11/12 (2006.01)
B60C 11/04 (2006.01)

(52) U.S. Cl.
CPC ...... B60C 11/1204 (2013.01); B60C 11/0302 (2013.01); B60C 11/042 (2013.01); B60C 11/1263 (2013.01); B60C 11/1236 (2013.01); B60C 2011/0341 (2013.01); B60C 2011/1209 (2013.01); B60C 2011/1213 (2013.01); B60C 2011/1227 (2013.01); B60C 2011/1268 (2013.01); B60C 2011/1295 (2013.01)

(58) Field of Classification Search
CPC ..... B60C 11/03; B60C 11/12; B60C 11/1204; B60C 2011/1213; B60C 2011/1227; B60C 11/1236; B60C 11/1263; B60C 11/1259
See application file for complete search history.

(56) References Cited

U.S. PATENT DOCUMENTS

| 4,736,783 | A | * | 4/1988 | Motomura | ............ | B60C 9/2006 |
| | | | | | | 152/209.22 |
| 6,050,313 | A | * | 4/2000 | Tsuda | ...................... | B60C 11/12 |
| | | | | | | 152/209.18 |
| 2007/0295434 | A1 | | 12/2007 | Nguyen et al. | | |
| 2009/0107601 | A1 | * | 4/2009 | Niknam | .................. | B60C 11/12 |
| | | | | | | 152/209.18 |
| 2011/0220260 | A1 | * | 9/2011 | Kaji | ..................... | B60C 11/1218 |
| | | | | | | 152/209.18 |
| 2013/0312886 | A1 | * | 11/2013 | Ohno | .................... | B60C 9/0292 |
| | | | | | | 152/209.1 |

(Continued)

FOREIGN PATENT DOCUMENTS

EP 1090781 B1 * 1/2005 ......... B60C 11/1263
EP 2353885 A1 8/2011
(Continued)

OTHER PUBLICATIONS

Extended European Search Report for corresponding European Application No. 18190372.5, dated Feb. 20, 2019.

Primary Examiner — Steven D Maki
Assistant Examiner — Cedrick S Williams
(74) Attorney, Agent, or Firm — Birch, Stewart, Kolasch & Birch, LLP

(57) ABSTRACT

A tire comprises a tread portion comprising at least one circumferentially continuously extending main groove, and a land portion divided by the above-said at least one main groove, wherein the land portion is provided with straight sipes and curved sipes each extending in the tire axial direction.

12 Claims, 6 Drawing Sheets

(56) References Cited

U.S. PATENT DOCUMENTS

| | | | |
|---|---|---|---|
| 2016/0193884 A1* | 7/2016 | Takemoto | B60C 11/0306 |
| | | | 152/209.18 |
| 2016/0263946 A1* | 9/2016 | Bonnamour | B60C 11/0332 |
| 2017/0253090 A1 | 9/2017 | Wakizono et al. | |
| 2019/0275842 A1* | 9/2019 | Mita | B60C 11/0309 |

FOREIGN PATENT DOCUMENTS

| EP | 3299183 A1 | 3/2018 |
|---|---|---|
| JP | 2005-14859 A | 1/2005 |
| JP | 2017-154709 A | 9/2017 |

* cited by examiner

TIRE

TECHNICAL FIELD

The present invention relates to a tire having a siped tread.

BACKGROUND ART

Japanese Patent Application Publication No. 2017-154709 discloses a pneumatic tire, wherein a crown land portion of the tread is provided with lateral sipes having the same shape in order to increase a frictional force against slippery roads. Such sipes help to improve wet performance and ice and snow performance of the tire by scratching the road surface as well known in the art.

SUMMARY OF THE INVENTION

When a pneumatic tire is provided with lateral sipes having the same shape, unpleasant noise is liable to be generated during running on a dry road surface because a so-called road noise is increased in the sound pressure in a specific frequency range due to the lateral sipes. This was found as a result of the inventor's research.

The present invention was made in view of the above circumstances, and a primary object of the present invention is to provide a vehicle tire, in which the noise performance can be prevented from deteriorating, without sacrificing wet performance provided by sipes.

According to the present invention, a tire comprises:
a tread portion comprising at least one circumferentially continuously extending main groove, and a land portion divided by the above-said at least one main groove, wherein the land portion is provided with straight sipes and curved sipes each extending in the tire axial direction.

It is preferable that the straight sipes and/or the curved sipes extend across the entire width of the land portion.

It is preferable that the straight sipes and the curved sipes are alternately disposed in the tire circumferential direction.

It is preferable that the curved sipes each have a wavy shape comprising a first curved portion convex toward one side in the tire circumferential direction and a second curved portion convex toward the other side in the tire circumferential direction.

It is preferable that the curved sipes are arranged such that a straight line drawn between the widthwise centers of both ends of each curved sipe is inclined with respect to the tire axial direction.

It is preferable that the drawn straight lines of the curved sipes, and the straight sipes are inclined to the same direction with respect to the tire axial direction.

It is preferable that the drawn straight lines of the curved sipes are inclined at a smaller angle with respect to the tire axial direction than the straight sipes.

It is preferable that maximum deviations of the groove edges of each of the curved sipes from the drawn straight line is in a range from 2.0 to 5.0 mm.

Each of the straight sipes and the curved sipes has a first end on one side in the tire axial direction, and a second end on the other side in the tire axial direction, and
it is preferable that the first ends of the straight sipes and the first ends of the curved sipes are arranged at non-uniform intervals in the tire circumferential direction.

It is preferable that each of the straight sipes and the curved sipes comprises
an intermediary first portion including a deepest portion deepest in the straight sipe,
a second portion located on one side in the tire axial direction, of the intermediary first portion, and
a third portion located on the other side in the tire axial direction, of the intermediary first portion.

It is preferable that the second portion has a depth, and the third portion has a depth different from that of the second portion.

It is preferable that the land portion is not provided with a groove having a width of more than 2.0 mm.

It is preferable that the above-said land portion is a crown land portion disposed closest to the tire equator.

DESCRIPTION OF THE PREFERRED EMBODIMENTS

The present invention can be applied to various tires, but, suitably applied to pneumatic tires for passenger cars, heavy duty vehicles and the like.

Taking a pneumatic tire for passenger cars as an example, embodiments of the present invention will now be described in detail in conjunction with accompanying drawings.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.
For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The tread edges Te are the axial outermost edges of the ground contacting patch of the tire which occurs under the normally inflated loaded condition when the camber angle of the tire is zero.

The tread width TW is the width measured under the normally inflated unloaded condition, as the axial distance between the tread edges Te determined as above.

The term "sipe" means a narrow groove having a width not more than 2.0 mm inclusive of a cut having no substantial width.

Figure 1:
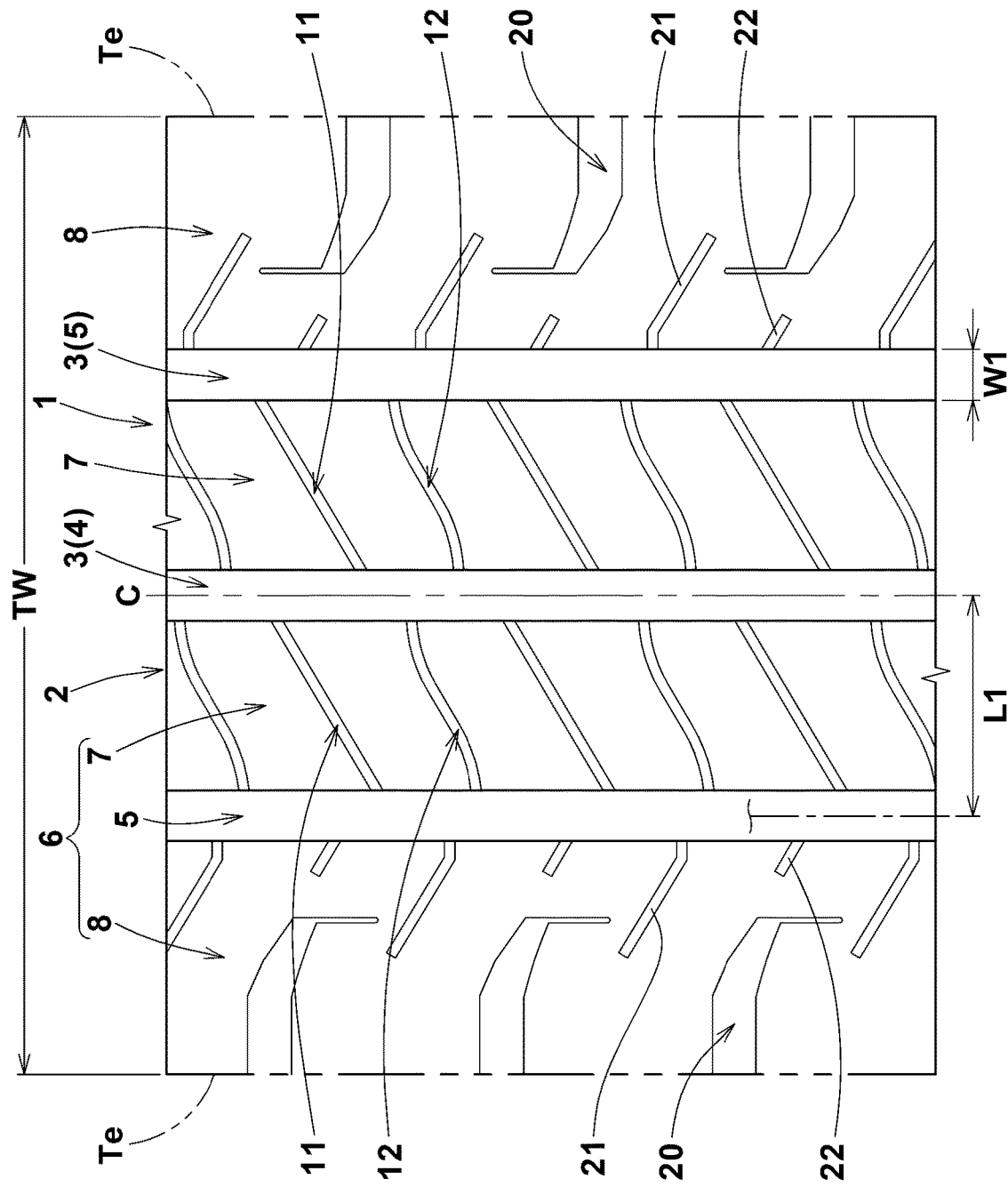
FIG. 1 is a developed partial view of the tread portion of a tire as an embodiment of the present invention.

FIG. 1 shows the tread portion 2 of a pneumatic tire 1 as an embodiment of the present invention.

In this embodiment, as shown in FIG. 1, the tread portion 2 is provided with a plurality of main grooves 3 extending continuously in the tire circumferential direction. Thereby, the tread portion 2 is axially divided into land portions 6.

The main grooves 3 in this example are one crown main groove 4 and two shoulder main grooves 5. The crown main groove 4 is disposed on the tire equator C. The shoulder main grooves 5 are disposed one on each side of the crown main groove 4 in the tire axial direction.

The main grooves 3 may be straight grooves, wavy grooves, zigzag grooves or a combination of such different grooves.
In this embodiment, the main grooves 3 are straight grooves.

As to the positions of the shoulder main grooves 5, it is preferable that the distance L1 of the widthwise center line of each groove 5 from the tire equator C is in a range from 0.20 to 0.30 times the tread width TW.

Preferably, the widths W1 of the main grooves 3 are set in a range from 4.0% to 7.0% of the tread width TW.
In the case of a pneumatic tire for passenger cars, it is preferable that the depths of the main grooves 3 are set in a range from 6 to 12 mm.
As a result, the steering stability on dry roads and on-snow performance are improved in a well-balanced manner.

The land portions 6 in this embodiment are a pair of crown land portions 7 between the crown main groove 4 and the shoulder main grooves 5, and a pair of shoulder land portions 8 axially outside the respective shoulder main grooves 5.

Figure 2:
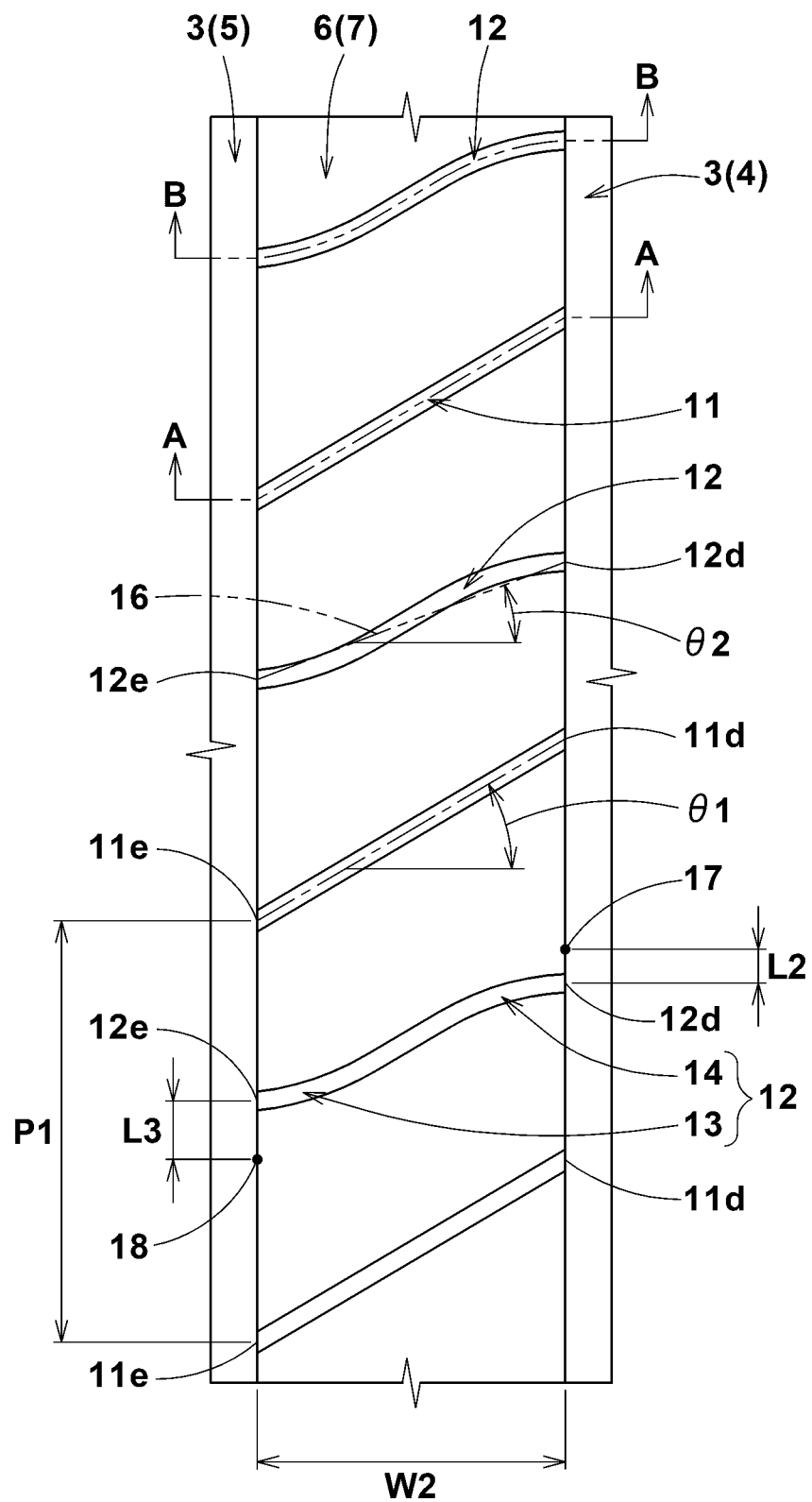
FIG. 2 is a partial top view of a crown land portion of the tire shown in FIG. 1.

Each of the crown land portions 7 is, as shown in FIG. 2, provided with straight sipes 11 and curved sipes 12 extending in the tire axial direction. Each straight sipe 11 is straight in the top view. Each curved sipe 12 is curved in the top view. The crown land portions 7 are not provided with a groove having a width of more than 2.0 mm.

During running, a sipe moves into and out of the ground contact patch of the tire as the tire rotates, and the sipe is opened and closed in a short time. As a result, the air flows in and out of the sipe. Accordingly, when an annular land portion is provided with a number of sipes having the same configuration, the sipes periodically emit the air during running, and tend to generate unpleasant sound in a specific frequency range (hereinafter referred to as the "sip noise").

According to the present invention, as the annular land portion 6 is provided with the straight sipes 11 and the curved sipes 12, although the sipes 11 and 12 may generate airflow sound, peaks of its frequency spectrum are not concentrated in a specific frequency range. Thus, it is possible to improve the noise performance, while ensuring good wet performance provided by the sipes.

It is preferable that the straight sipes 11 and/or the curved sipes 12 extend across the entire width of the land portion 6. In this embodiment, each of the straight sipes 11 and curved sipes 12 extends across the entire width of the land portion 6.

It is preferable that the straight sipes 11 and the curved sipes 12 are alternately arranged in the tire circumferential direction in order that peaks of the frequency spectrum are not concentrated in a specific frequency range. The present invention is however, not limited to such alternate arrangement.

It is preferable that the straight sipes 11 are inclined at an angle θ1 with respect to the tire axial direction.

It is preferable that the straight sipes 11 provided in each land portion 6 are inclined in the same direction with respect to the tire axial direction.

Such inclined straight sipes 11 are useful for improving the braking performance on wet roads.

The angle θ1 of the straight sipes 11 is preferably not less than 30 degrees, more preferably not less than 35 degrees, but preferably not more than 45 degrees, more preferably not more than 40 degrees. Such straight sipes 11 can suppress uneven wear of the land portion, while exerting the above-mentioned effect.

It is preferable that the pitch lengths P1 in the tire circumferential direction between the straight sipes 11 are set in a range from 1.0 to 1.3 times the width W2 in the tire axial direction of the land portion 6. Thereby, the noise performance and the wet performance are improved in a well-balanced manner.

Figure 3A:
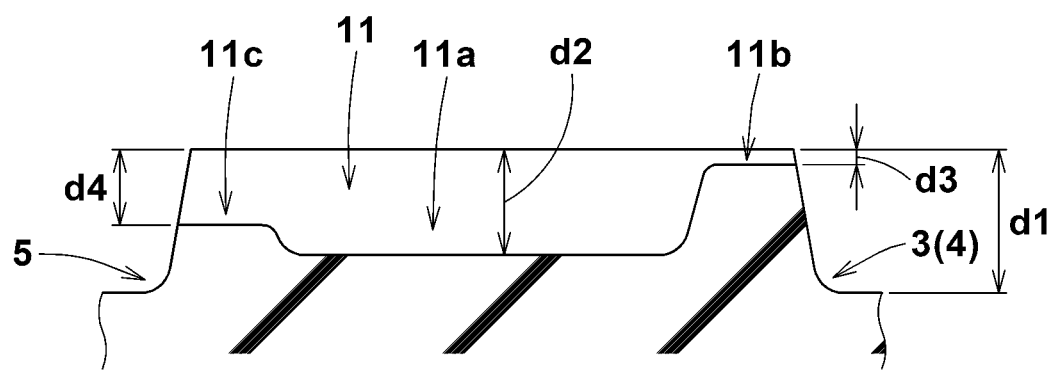
FIG. 3(a) is a cross-sectional view taken along line A-A in FIG. 2.

Each of the straight sipes 11 comprises, as shown in FIG. 3(a), an intermediary first portion 11a including the deepest portion deepest in the sipe, a second portion 11b located on one side in the tire axial direction of the intermediary first portion 11a, and a third portion 11c located on the other side in the tire axial direction of the intermediary first portion 11a.

The intermediary first portion 11a includes the center in the tire axial direction of the straight sipe 11.

The intermediary first portion 11a in this example has a depth d2 smaller than the depth d1 of the main grooves 3.

It is preferable that the depth d2 of the intermediary first portion 11a is set in a range from 0.65 to 0.80 times the depth d1 of the main groove 3 in order to improve the wet performance and wear resistance.

The second portion 11b is disposed between the intermediary first portion 11a and the crown main groove 4.

The second portion 11b has a depth d3 smaller than the depth d2 of the intermediary first portion 11a.

It is preferable that the depth d3 of the second portion 11b is set in a range from 0.10 to 0.20 times the depth d2 of the intermediary first portion 11a.

Such second portion 11b can improve the noise performance and the wear resistance in a well-balanced manner.

The third portion 11c is disposed between the intermediary first portion 11a and the shoulder main groove 5.

The third portion 11c has a depth d4 different from the depth d3 of the second portion 11b.

In this embodiment, it is preferable that the depth d4 of the third portion 11c is smaller than the depth d2 of the intermediary first portion 11a and larger than the depth d3 of the second portion 11b.

It is preferable that the depth d4 of the third portion 11c is set in a range from 0.65 to 0.75 times the depth d2 of the intermediary first portion 11a.

It is preferable that, as shown in FIG. 2, the curved sipes 12 each have a wavy shape comprising (in this example consisting of) a first curved portion 13 convex toward one side in the tire circumferential direction, and a second curved portion 14 convex toward the other side in the tire circumferential direction. Such curved sipes 12 improve the noise performance and the wear resistance.

Figure 4:
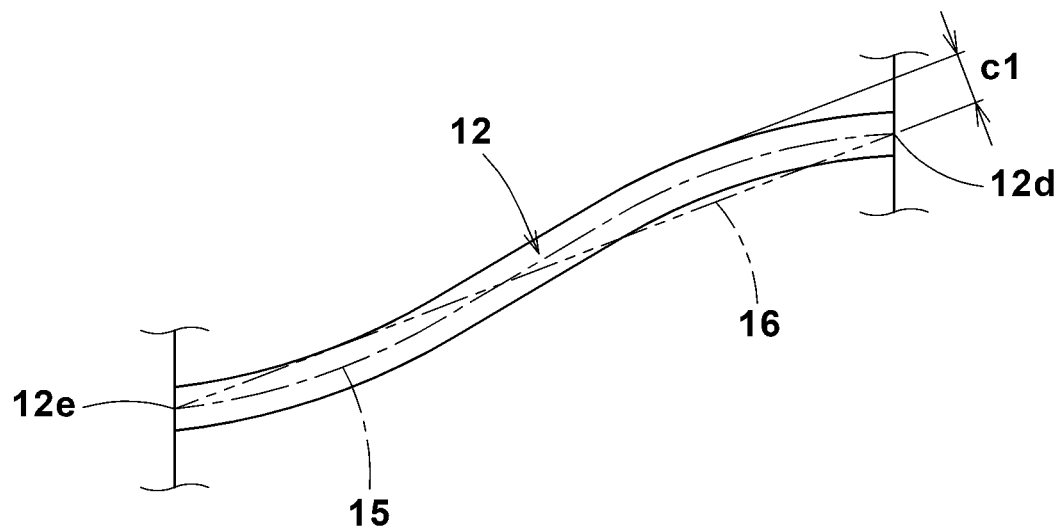
FIG. 4 is an enlarged view of a curved sipe shown in FIG. 2.

It is preferable that, as shown in FIG. 2, the curved sipes 12 are arranged such that a straight line 16 drawn, as shown in FIG. 4, between both ends (12d, 12e) of the widthwise center line 15 of each curved sipe 12 is inclined with respect to the tire axial direction.

It is preferable that the drawn straight lines 16 of all the curved sipes 12 disposed in each land portion 6 are inclined in the same direction with respect to the tire axial direction.

It is preferable that, as shown in FIG. 2, the drawn straight lines 16 of the curved sipes 12 are inclined to the same direction as the straight sipes 11 with respect to the tire axial direction. Such sipe arrangement helps to suppress uneven wear of the land portion.

It is preferable that the drawn straight lines 16 of the curved sipes 12 are inclined at an angle θ2 smaller than the angle of the straight sipes 11 with respect to the tire axial direction. The angle θ2 of the straight lines 16 is preferably not less than 20 degrees, more preferably not less than 25 degrees, but preferably not more than 35 degrees, more preferably not more than 30 degrees with respect to the tire axial direction.

It is preferable that maximum deviations c1 (shown in FIG. 4) of the edges of each of the curved sipes 12 from the straight line 16 is preferably not less than 2.0 mm, more preferably not less than 2.5 mm, but preferably not more than 5.0 mm, more preferably not more than 4.0 mm.

Such configuration of the curved sipes 12 helps to disperse the above-mentioned peaks of the frequency spectrum into a more wide frequency range, while suppressing uneven wear of the land portion.

The straight sipes 11 and the curved sipes 12 each have a first end on one side in the tire axial direction (for example, on the tire equator side), and a second end on the other side in the tire axial direction (for example, on the tread edge side).

It is preferable that the first ends 11d of the straight sipes 11 and the first ends 12d of the curved sipes 12 are arranged at non-uniform intervals in the tire circumferential direction as shown in FIG. 2.

Also, the second ends 11e of the straight sipes 11 and the second end 12e of the curved sipes 12 are arranged at non-uniform intervals in the tire circumferential direction as shown in FIG. 2.

Thereby, the distance between the adjacent straight sipe 11 and curved sipe 12 becomes not uniform in the tire axial direction, and accordingly, a portion therebetween where the distance is shorter becomes easy to move moderately. As a result, abrupt deformation (opening and closing) of the sipe is suppressed, and the sipe noise can be reduced.

As shown in FIG. 2, it is preferred that the first ends 12d of the curved sipes 12 are deviated toward one side in the tire circumferential direction from the center positions 17 of the respective pitch lengths P1 between the first ends 11d of the circumferentially adjacent straight sipes 11.

Also, the second ends 12e of the curved sipes 12 are deviated toward the other side in the tire circumferential direction from the center positions 18 of the respective pitch lengths P1 between the second ends 11e of the circumferentially adjacent straight sipes 11.

It is preferable that the deviations L2 in the tire circumferential direction from the center positions 17 to the first ends 12d of the curved sipes 12, and
the deviations L3 in the tire circumferential direction from the center positions 18 to the second ends 12e of the curved sipes 12 are set in a range from 0.10 to 0.18 times the respective pitch lengths P1 in order to obtain the above-mentioned effect while maintaining the wear resistance of the land portion.

Figure 3B:
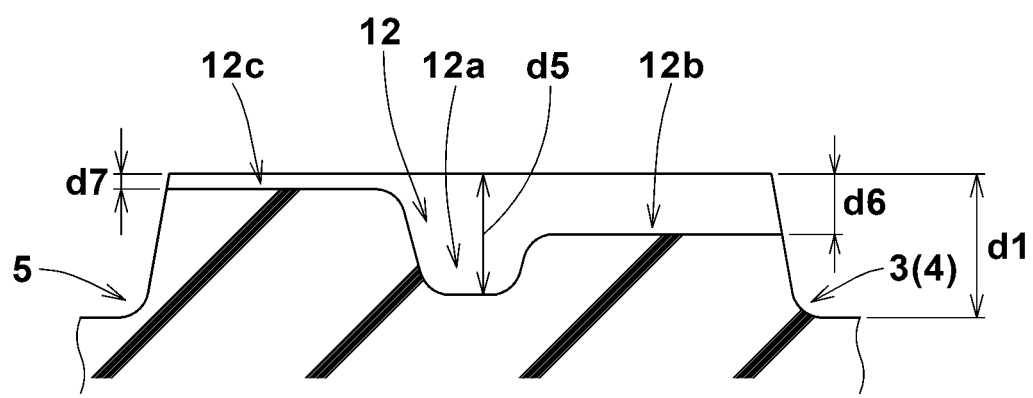
FIG. 3(b) is a cross-sectional view taken along line B-B in FIG. 2.

As shown in FIG. 3(b) which shows a cross-sectional view of the curved sipe 12 taken along the widthwise center line thereof, each curved sipe 12 comprises an intermediary first portion 12a including the deepest portion deepest in the sipe 12, a second portion 12b disposed on one side in the tire axial direction of the intermediary first portion 12a, and a third portion 12c disposed on the other side in the tire axial direction of the intermediary first portion 12a.

The intermediary first portion 12a includes the center in the tire axial direction of the curved sipe 12. The intermediary first portion 12a has a depth d5 smaller than the depth d1 of the main grooves 3. Preferably, the depth d5 of the intermediary first portion 12a is 0.80 to 0.90 times the depth d1 of the main grooves 3. The depth d5 of the intermediary first portion 12a is larger than the depth of the intermediary first portions 11a of the straight sipes 11.

The second portion 12b is located between the intermediary first portion 12a and the crown main groove 4.

The second portion 12b has a depth d6 smaller than the depth d5 of the intermediary first portion 12a. Preferably, the depth d6 of the second portion 12b is 0.45 to 0.55 times the depth d5 of the intermediary first portion 12a. The depth d6 of the second portion 12b of the curved ripe 12 is greater than the depth of the second portion 11b of the straight sipes 11.

The third portion 12c is disposed between the intermediary first portion 12a and the shoulder main groove 5. The third portion 12c has a depth different from the second portion 12b. It is preferable that the depth of the third portion 12c is smaller than the depth of the second portion 12b and also smaller than the depth of the intermediary first portion 12a.

The third portion 12c of the curved sipes 12 has a depth d7 greater than the third portion 11c of the straight sipes 11. The depth d7 of the third portion 12c is preferably 0.05 to 0.20 times the depth d5 of the intermediary first portion 12a.

In this embodiment, the variation of the depth of the curved sipe 12 is different from that of the straight sipe 11, therefore, peaks of the sound spectrum of the noise generated by the curved sipes 12 become different from those of the straight sipes 11, and accordingly, overall noise is further dispersed and the noise performance can be further improved.

Figure 5:
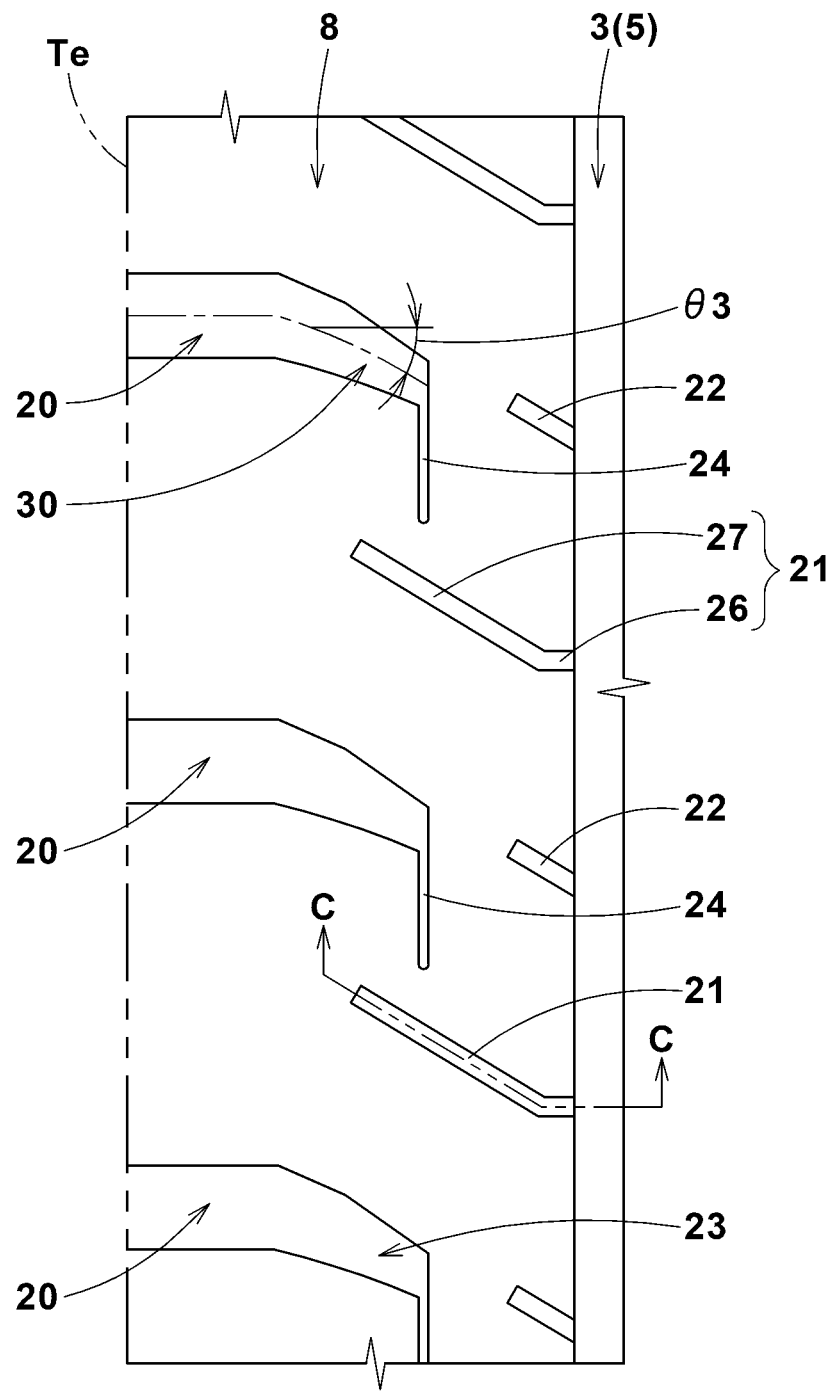
FIG. 5 is a partial top view of a shoulder land portion of the tire shown in FIG. 1.

FIG. 5 is a partial top view of the shoulder land portion 8. As shown, the shoulder land portions 8 are each provided with shoulder lateral grooves 20, first shoulder sipes 21 and second shoulder sipes 22.

Each of the shoulder lateral grooves 20 extends radially inwardly from the tread edge Te toward the shoulder main groove 5, but terminated with in the shoulder land portion 8 without reaching the shoulder main groove 5. Thus, it is possible to prevent so called pumping sound due to high-speed air flow during running.

In order to further enhance the above-mentioned noise reducing effect, it is preferable that the angles θ3 of the shoulder lateral grooves 20 with respect to the tire axial direction are each gradually increased from the tread edges Te toward the shoulder main grooves 5.

In this example, axially inner portions 23 of the shoulder lateral grooves 20 disposed in the shoulder land portions 8 are inclined with respect to the tire axial direction to the opposite direction to the straight sipes 11 disposed in the crown land portions 7 as shown in FIG. 1.

On the other hand, the axially outer portions of the shoulder lateral grooves 20 are substantially partial with the tire axial direction. As a result, the dispersion of peaks of the sound spectrum of noise generated by the shoulder lateral grooves 20 becomes different from the dispersion of peaks of the sound spectrum of the noise generated by the straight sipes 11, and the noise performance is improved.

It is preferable that the shoulder lateral grooves 20 are gradually decreased in the width toward the shoulder main grooves 5. In this example, the width is continuously decreased in the axially inner portion 23, but it is constant in the axially outer portions.

Further, in this example, the shoulder land portions 8 are provided with short third shoulder sipes 24. The short third shoulder sipes 24 extend in the tire circumferential direction from the axially inner ends of the respective shoulder lateral grooves 20. In each of the shoulder land portions 8, the short third shoulder sipes 24 extends toward one direction which is the same as the inclining direction of the axially inner portions 23 as shown in FIG. 1. Such short third shoulder sipes 24 can suppress uneven wear in the vicinity of the inner end portions 23.

The first shoulder sipes 21 extend from the shoulder main grooves 5 toward the respective tread edges Te and terminate within the respective shoulder land portions 8. Preferably, the first shoulder sipes 21 extend axially outwardly beyond the axial position of the axially inner ends of the shoulder lateral grooves 20.

In this example, as shown in FIG. 5, the first shoulder sipe 21 is composed of an axially inner portion 26 extending axially outwardly from the shoulder lateral groove 20 along the tire axial direction, and an axially outer major portion 27 extending axially outwardly from the axially inner portion 26 and obliquely with respect to the tire axial direction.

It is preferable that, in each of the shoulder land portions 8, the axially outer major portions 27 are inclined with respect to the tire axial direction toward one direction which is opposite to the inclining direction of the straight sipes 11 provided in the crown land portions 7.

As a result, the dispersion of peaks of the sound spectrum of noise generated by the first shoulder sips 21 becomes different from the dispersion of peaks of the sound spectrum of the noise generated by the straight sipes 11, and the noise performance is improved.

Figure 6:
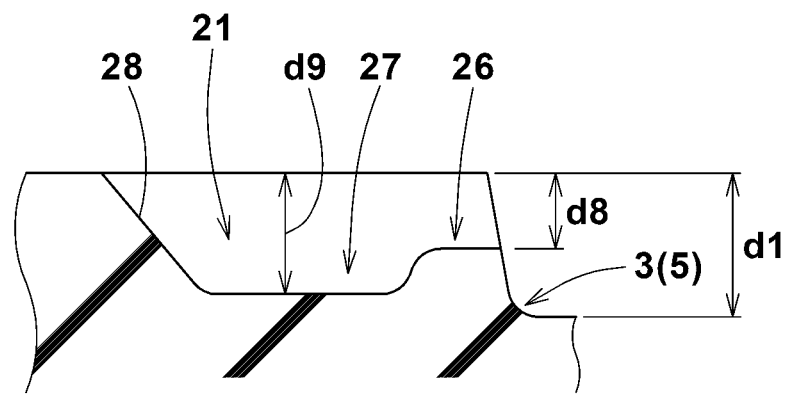
FIG. 6 is a cross-sectional view taken along line C-C in FIG. 5.

FIG. 6 shows a cross-sectional view of the first shoulder sipe 21 taken along line C-C of FIG. 5. As shown, the depth d8 of the axially inner portion 26 of the first shoulder sipe 21 is preferably set in a range from 0.45 to 0.60 times the depth d1 of the main groove 3 to which the sipe 21 is opened.

It is preferable that the axially outer major portion 27 of the first shoulder sipe 21 has a maximum depth d9 larger than the depth d8 of the axially inner portion 26. Preferably, the maximum depth d9 in the axially outer major portion 27 is set in a range from 0.80 to 0.90 times the depth d1 of the main groove 3. Such first shoulder sipes 21 can improve the noise performance and the wear resistance of the shoulder land portions 8 in a well-balanced manner.

Preferably, the axially outer major portion 27 includes a part in which the depth is constant (=maximum depth d9), and a part 28 in which the depth is gradually decreased from the maximum depth toward the axially outside.

In this example, as shown in FIG. 5, the second shoulder sipes 22 extends axially outwardly from the shoulder main grooves 5 and terminate within the respective shoulder land portion 8. In this example, the second shoulder sipes 22 are shorter than the first shoulder sipes 21. The second shoulder sipes 22 are inclined with respect to the tire axial direction toward the same direction as the inclining direction of the first shoulder sipes 21. Such second shoulder sipes 22 can enhance the wet performance while maintaining the wear resistance of the shoulder land portions 8.

While detailed description has been made of a preferable embodiment of the present invention, the present invention can be embodied in various forms without being limited to the illustrated embodiment.

Comparison Tests

Based on the tread pattern shown in FIG. 1, pneumatic tires of size 235/65R16 (rim size 16×6.5J) were experimentally manufactured as test tires (Comparative tire REF and working example tires EX1-EX12).

Figure 7:
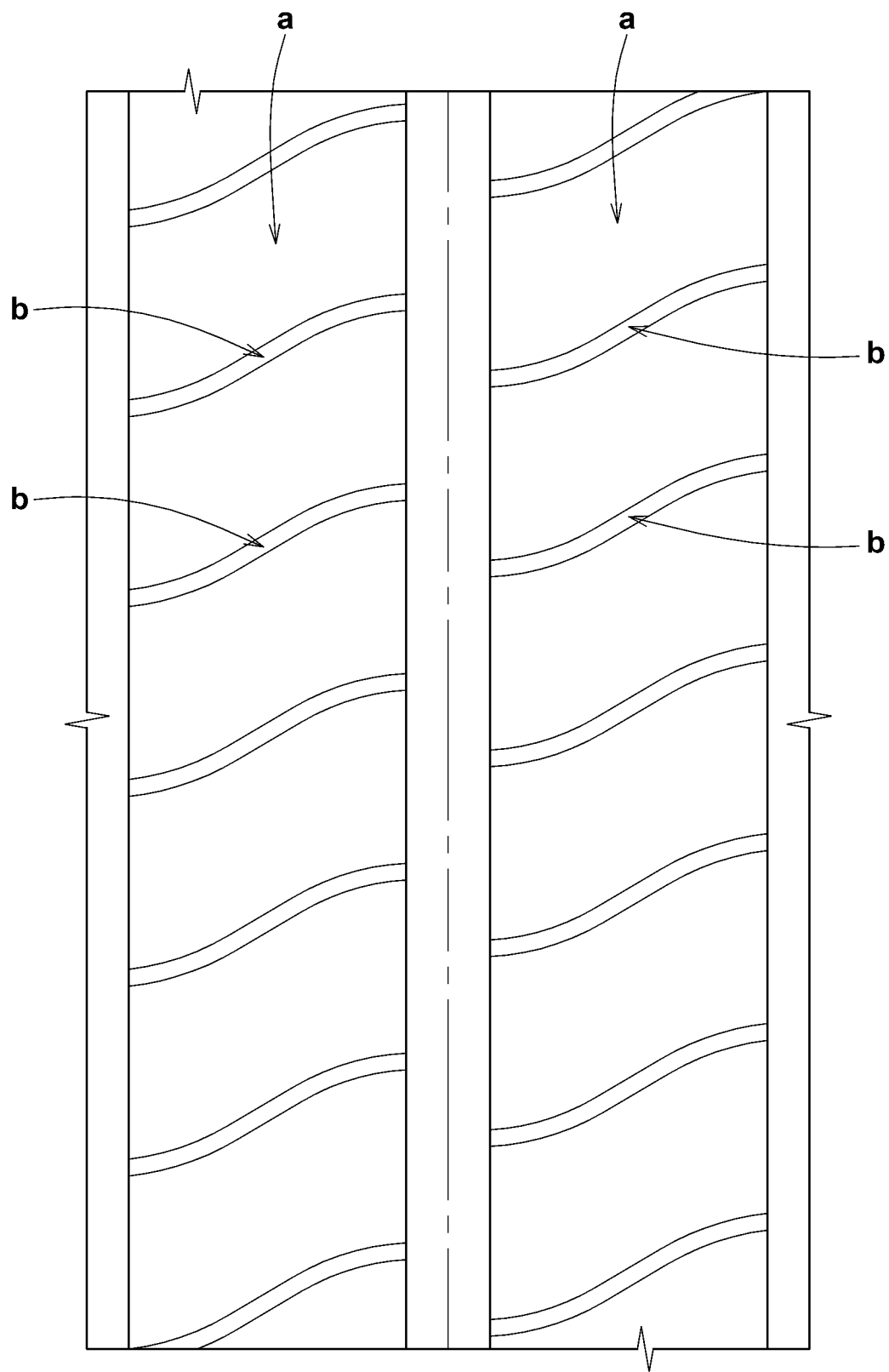
FIG. 7 is a partial view of the tread portion of a tire as a comparative example showing crown land portions.

In the comparative tire, the crown land portions were provided with only the curved sipes (b) as shown in FIG. 7, otherwise the tread pattern was similarly to that shown in FIG. 1.

The specifications of the test tires are shown in Table 1.

Each test tire was tested for the noise performance, wet performance and wear resistance as follows by the use of a test car (2000 cc 4WD passenger car, front tire pressure 340 kPa, rear tire pressure 420 kPa).

<Noise Performance Test>

The test car was run on a dry road surface at a speed of 100 km/h, and the noise during running was measured in the interior of the test car. The results are indicated in Table 1 by an index based on comparative example being 100, wherein the smaller the numerical value, the smaller the interior noise.

<Wet Performance Test>

The test car was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in Table 1 by an index based on comparative example being 100, wherein the larger the numerical value, the better the wet performance.

<Wear Resistance Test>

The test car was run on a dry road surface for a predetermined distance, and then the amount of wear in the crown land portions was measured. The results are indicated in Table 1 by an index based on comparative example being 100, wherein the smaller the numerical value, the smaller the amount of wear (namely, the better the wear resistance).

TABLE 1

| Tire | REF | EX1 | EX2 | EX3 | EX4 | EX5 | EX6 |
|---|---|---|---|---|---|---|---|
| tread pattern (FIG. No.) | 7 | 1 | 1 | 1 | 1 | 1 | 1 |
| curved sipes' max. deviation c1 (mm) | — | 2.5 | 1.5 | 2.0 | 3.5 | 4.0 | 5.0 |

TABLE 1-continued

| | | | | | | | |
|---|---|---|---|---|---|---|---|
| straight sipes' angle θ1 (deg.) | — | 35 | 35 | 35 | 35 | 35 | 35 |
| curved sipes' angle θ2 (deg.) | — | 25 | 25 | 25 | 25 | 25 | 25 |
| noise performance | 100 | 93 | 95 | 94 | 93 | 92 | 92 |
| wet performance | 100 | 100 | 99 | 100 | 100 | 101 | 101 |
| wear resistance | 100 | 98 | 97 | 98 | 98 | 100 | 102 |

| Tire | EX7 | EX8 | EX9 | EX10 | EX11 | EX12 | EX13 |
|---|---|---|---|---|---|---|---|
| tread pattern (FIG. No.) | 1 | 1 | 1 | 1 | 1 | 1 | 1 |
| curved sipes' max. deviation c1 (mm) | 2.5 | 2.5 | 2.5 | 2.5 | 2.5 | 2.5 | 2.5 |
| straight sipes' angle θ1 (deg.) | 25 | 30 | 40 | 45 | 20 | 25 | 30 |
| curved sipes' angle θ2 (deg.) | 15 | 20 | 30 | 35 | 30 | 35 | 40 |
| noise performance | 93 | 93 | 93 | 94 | 94 | 94 | 95 |
| wet performance | 98 | 99 | 100 | 102 | 99 | 99 | 100 |
| wear resistance | 97 | 97 | 98 | 100 | 99 | 100 | 101 |

From the test results, it was confirmed that the tires according to the present invention were improved in the noise performance, without sacrificing the wet performance and the wear resistance.

DESCRIPTION OF THE REFERENCE SIGNS 2 tread portion
3 main groove
6 land portion
11 straight sipe
12 curved sipe

The invention claimed is:

1. A tire comprising:
a tread portion comprising at least one circumferentially continuously extending main groove, and a land portion divided by said at least one main groove, wherein the land portion is provided with straight sipes and curved sipes each extending in the tire axial direction, wherein:
said at least one circumferentially continuously extending main groove is three main grooves axially dividing the tread portion into an axially inner crown land portion and an axially outer shoulder land portion which are positioned on each side of the tire equator,
said land portion provided with the straight sipes and the curved sipes is said axially inner crown land portion,
in each of the crown land portions, the straight sipes and the curved sipes are arranged alternately in the tire circumferential direction,
each of the curved sipes has a wavy shape and comprises a first curved portion convex toward one side in the tire circumferential direction and a second curved portion convex toward the other side in the tire circumferential direction,
a straight line drawn between the widthwise centers of both ends of each of the curved sipes is inclined with respect to the tire axial direction,
in the crown land portions, the drawn straight lines of the curved sipes and the straight sipes are inclined to the same direction with respect to the tire axial direction, and the angles of the drawn straight lines with respect to the tire axial direction are smaller than the angles of the straight sipes with respect to the tire axial direction,
each of the shoulder land portions is provided with shoulder lateral grooves extending axially inwardly from an adjacent tread edge and terminating within the shoulder land portion,
the angle of each of the shoulder lateral grooves with respect to the tire axial direction is gradually increased from the tread edge toward the axially inside,
each of the shoulder lateral grooves comprises an axially inner portion inclined with respect to the tire axial direction in an opposite direction to the straight sipes provided in the crown land portions,
each of the shoulder lateral grooves has a groove width gradually decreased toward the adjacent main groove,
each of the shoulder lateral grooves has an axially inner end to which a sipe extending in the tire circumferential direction is connected, and
each of the shoulder land portions is provided with shoulder sipes extending from the adjacent main grooves toward the axially outside and terminating within the shoulder land portion.

2. The tire according to claim 1, wherein
the straight sipes and/or the curved sipes extend across the entire width of the crown land portion.

3. The tire according to claim 1, wherein
maximum deviations of edges of each of the curved sipes from the drawn straight line is in a range from 2.0 to 5.0 mm.

4. The tire according to claim 1, wherein
the crown land portions are not provided with a groove having a width of more than 2.0 mm.

5. The tire according to claim 1, wherein
each of the curved sipes in one of the crown land portions and one of the straight sipes in the other of the crown land portions are arranged in line.

6. The tire according to claim 1, wherein
the crown land portions are provided with no sipe or groove other than the curved sipes and the straight sipes.

7. The tire according to claim 1, wherein
each of the three main grooves is a straight groove.

8. The tire according to claim 1, wherein
the shoulder sipes extend axially outwardly beyond the axial position of the axially inner ends of the shoulder lateral grooves.

9. The tire according to claim 1, wherein
each of the straight sipes and the curved sipes has a first end on one side in the tire axial direction, and a second end on the other side in the tire axial direction, and
in each of the crown land portions, the first ends of the straight sipes and the first ends of the curved sipes are arranged at non-uniform intervals in the tire circumferential direction.

10. The tire according to claim 9, wherein
in each of the crown land portions, the second ends of the straight sipes and the second ends of the curved sipes are arranged at non-uniform intervals in the tire circumferential direction.

11. The tire according to claim 1, wherein
the straight sipes and the curved sipes each comprise
an intermediary first portion including a deepest portion deepest in the sipe,
a second portion located on one side in the tire axial direction, of the intermediary first portion, and
a third portion located on the other side in the tire axial direction, of the intermediary first portion.

12. The tire according to claim 11, wherein the second portion has a depth, and the third portion has a depth different from that of the second portion.

* * * * *